United States Patent [19]

Tsien

[11] 4,169,816
[45] Oct. 2, 1979

[54] ELECTRICALLY CONDUCTIVE POLYOLEFIN COMPOSITIONS

[75] Inventor: Hsue C. Tsien, Chatham, N.J.

[73] Assignee: Exxon Research & Engineering Co., Florham Park, N.J.

[21] Appl. No.: 883,902

[22] Filed: Mar. 6, 1978

[51] Int. Cl.$^2$ .......................... H01B 1/06; H01B 1/08
[52] U.S. Cl. ................................ 252/511; 260/42.18; 260/42.47
[58] Field of Search ..................... 252/511; 260/42.18, 260/42.47

[56] References Cited

U.S. PATENT DOCUMENTS

| | | | |
|---|---|---|---|
| 3,591,526 | 7/1971 | Kawashima et al. | 260/42.46 X |
| 3,697,450 | 10/1972 | Takenaka et al. | 252/511 |
| 3,969,124 | 7/1976 | Stewart | 252/511 X |
| 4,002,595 | 1/1977 | Adelman | 260/42.46 X |
| 4,048,137 | 9/1977 | Heitmann | 260/42.18 X |

Primary Examiner—Benjamin R. Padgett
Assistant Examiner—E. Suzanne Parr
Attorney, Agent, or Firm—Joseph J. Dvorak

[57] ABSTRACT

This invention provides an electrically conductive polyolefin composition which contains a balanced mixture of fillers which increase the extrudability of the polyolefin composition into shaped articles of improved flex strength and resistance to shrinkage. The amounts of constituents of compositions of this invention, expressed in parts by weight, are as follows: 100 parts of polypropylene-ethylene copolymer, 15-30 parts of carbon black, 0.25 to 1 part of silica, and 1-10 parts of a fiber-reinforcing agent selected from carbon fibers or mixtures of carbon and glass fibers; and when the fiber-reinforcing agent is a mixture of carbon and glass fibers, then the composition shall contain from 1 to 5 parts of glass fibers and from 1 to 5 parts of carbon fibers.

13 Claims, No Drawings

ELECTRICALLY CONDUCTIVE POLYOLEFIN COMPOSITIONS

BACKGROUND OF THE INVENTION

1. Field of the Invention

The present invention relates to plastic compositions which are electrically conductive. Indeed, the present invention is particularly concerned with the preparation of electrically conducting nonporous, thin sheet elements from polyolefins useful especially in the construction of conductive plates for electrochemical cells.

2. Prior Art

Many attempts have been made to make conductive or semiconductive materials from polymeric plastics loaded with conductive solids such as carbon black, graphite or finely divided metals. All manners of thermoplastic and thermosetting resins have been proposed including melamine, phenol-aldehyde, and more commonly polyolefins such as polyethylene and graft copolymers thereof. See, for example, U.S. Pat. No. 3,591,526 and U.S. Pat. No. 3,673,121.

In general, compositions of relatively low resistance can be prepared by dry mixing a finely divided thermoplastic polymer and conductive filler and molding the mixtures under heat and pressure. Such molded products are normally porous and nonhomogeneous in structure, and, accordingly, are not suitable for certain sophisticated applications which require thin impermeable conductors of highly uniform composition. An example of such a sophisticated application is a bipolar plate for a fuel cell or battery. In this regard, see, for example, U.S. Pat. No. 3,814,631 and U.S. Pat. No. 3,530,003.

A far higher degree of homogeneity than is obtained by a dry blending process can be obtained by the use of known mixing devices such as a Banbury mixer or roll mill. French Pat. No. 1,305,140 describes the preparation in a Banbury mixer of a number of blends of carbon black or graphite in a crystalline polypropylene with or without an amorphous copolymer plasticizer. The resistivities of these blends are all of an order of a number of megaohms-centimeter and they are described as suitable for use as thermistors and semiconductors rather than for use in highly conductive applications. Moreover, such carbon-plastic blends are not capable of being easily formed, for example, by extrusion into thin nonporous sheet-like structures, particularly thin sheet elements having thicknesses of, for example, from about 150 microns to about 500 microns.

As should be readily appreciated, when working with then sheet elements having thicknesses, for example, in the range from about 150 microns to about 500 microns, the physical strength of such material becomes an important mechanical property. Thus, while it was known in the past to add carbon to polymers to increase their electrical conductivity, frequently the blended material made in a Banbury mixer will be brittle. Indeed, many such materials will snap completely in pieces when an attempt is made to bend them at a 90° angle.

In addition to having the requisite flex strength for sophisticated applications such as that of the bipolar plate for a fuel cell or battery, it is highly desirable that the requisite composition not shrink upon cooling from a melted condition and be capable of being thermally bonded to other plastic materials, for example, such as a frame for a bipolar plate or to a metal surface such as a current collector. Many of the foregoing properties would appear almost to be impossible to achieve in a single composition. For example, it is known that plastics can be reinforced with fibers such as glass. An example of such compositions can be found, for example, in U.S. Pat. No. 3,853,808 and U.S. Pat. No. 3,819,568. As will be readily appreciated, the addition of glass, however, tends to decrease the electrical conductivity of compositions containing such material.

In U.S. Pat. No. 4,002,595, it is reported that the addition of about 1% of finely divided silica to polyethylene filled with carbon black increased the conductivity only slightly and that 3–5% additions of such finely divided silica decreased the conductivity. The patent further indicates, however, that addition of various nonconductive fillers in natural rubber, for example, plays no part in determining the resistivity and that the latter is determined only by the relative quantity of carbon black and filled compound.

Thus, it should be readily apparent that the performance of compositions described in the literature leaves much to be desired. For reasons cited herein, it has been difficult to prepare compositions which are exceedingly homogeneous, which have great flex strength, are highly electrically conducting, are injection moldable and are impermeable, for example, to bromine when used as bipolar plates in a metal bromide battery.

SUMMARY OF THE INVENTION

Accordingly, this invention provides electrically conductive polyolefin compositions which contain a balanced mixture of fillers which improves the extrudability of the composition as well as improves the flex strength and the resistance to shrinkage of elements formed from such compositions. These compositions are further characterized by their improved weldability and adhesion to metal. Most importantly, these compositions possess electrical conductivities below about 10 ohm-cm, when measured across a sheet formed from such compositions.

These compositions comprise a polypropylene-ethylene copolymer; a silica filler; a fiber-reinforcing agent; and a high surface area carbon black. Optionally, these compositions also include a polypropylene-ethylenically unsaturated carboxylic copolymer.

The preferred polypropylene-ethylene copolymer is a reactive copolymer having at least 20 mole % ethylene. The preferred form of finely divided carbon used in the practice of the present invention will have a surface area generally greater than about 500 m$^2$/g and preferably about 1000 m$^2$/g and an apparent bulk density of about 150 g/liter. The reinforcing fiber preferably will be selected from carbon fibers having a length from about 1 to 3 inches and mixtures of such carbon fibers with chopped glass fibers of staple length. The silica filler typically will have a surface area of greater than about 300 m$^2$/g. Finally, the optional ethylenically unsaturated carboxylic-propylene copolymer is preferably an acrylic acid copolymer having about 2% to 10% acrylic acid and a melt flow rate of about 50 as measured by ASTM Test Method 1238-70. The amounts of constituents of compositions of the invention expressed in parts by weight are as follows:

(a) 100 parts of said propylene-ethylene copolymer;
(b) 15 to 30 parts of said carbon black;
(c) 1 to 10 parts of said fiber-reinforcing agent selected from carbon fibers and mixtures of carbon and glass fibers.

When said agent is a mixture of carbon and glass fibers, then said composition shall contain from 1 to 5 parts of glass fibers, and from 1 to 5 parts carbon fibers and 0.25 to 1.0 parts of silica.

A particularly preferred composition comprises: 100 parts of said copolymer; 25 parts of said carbon black; 5 parts of carbon fiber; 5 parts of glass fiber; and 1 part of fumed silica.

The compositions of this invention are particularly useful in forming electrically conductive thin sheet elements such as an electrode. Thus in one embodiment of the present invention there is provided an electrically conductive nonporous polyolefin element which has improved impermeability to liquids such as bromine and which comprises: a mixture of 100 parts of a crystalline propylene-ethylenecopolymer; 15 to 30 parts of carbon black; 1 to 10 parts of fiber-reinforcing agent selected from carbon fibers and mixtures of carbon and glass fibers containing not more than 5 parts of glass fibers; and 0.25 to 1.0 parts of fumed silica, the element being in the form of a thin sheet having a thickness of from about 150 microns to about 500 microns and having an electric resistivity of below about 10 ohm-cm as determined by ASTM Test Method D-257-61.

DETAILED DESCRIPTION OF THE INVENTION

A. The Starting Materials

The polyolefin material employed in the present invention is a crystalline polyethylene-propylene thermoplastic reactive copolymer having at least 20 mole % ethylene. Indeed, the copolymer has a minimum ethylene content of 20 mole %, but for practical purposes the ethylene content should not exceed about 35 mole % since above this level the thermosplastic characteristics tend to be lost and the product becomes an elastomer. In addition, the copolymer when intended for electrochemical cell use is preferably highly purified, e.g., by extraction with solvents such as chloroform or isopropanol to remove catalyst residues and stabilizers which would act as poisons or otherwise interfere with the electrochemical reactions taking place in the cells. Obviously, this is not necessary when the end use is one in which their presence is harmless. A most desirable class of ethylene-propylene copolymers is one having a melt flow rate of at least 2 and preferably from about 3 to 5 gm/10 min. as measured by ASTM Test Method D-1238. Such materials are commercially available. For example, a number of suitable polyethylene-propylene copolymers are available under the trade name "Profax" from Hercules Inc., Wilmington, Del.

In order to have the composition have the requisite electrical conductivity, the composition should contain at least 15 parts by weight, preferably 30 parts by weight, of finely divided conductive carbon per hundred parts (hereinafter pph) of the copolymer. Clearly 35 pph of the conductive carbon should not be employed; otherwise, the composition is too brittle and also less easily extrudable into thin nonporous sheets. Moreover, increasing the carbon content up to about 35 pph tends to increase the permeability of the thin sheet elements formed from such compositions to liquids such as bromine, as an example.

It is especially preferred that the finely divided conductive carbon, for example, carbon black, have a surface area greater than about 500 $m^2/g$ and preferably have a surface area of about 1000 $m^2/g$. Suitable carbon blacks are commercially available. For example, a typical commercially available carbon black having a surface area of about 1000 $m^2/g$ and an apparent bulk density of 150 g/liter is sold under the tradename "Ketjen Black EC" by Noury Chemical Corporation, Burt, N.Y.

In order to increase the flex strength of the resultant article, the composition of the present invention contains reinforcing fibers selected from carbon fibers and mixtures of carbon and glass fibers. The fiber constituent will range from about 1 to about 10 pph of copolymer and when glass fibers are included up to 5 wt. % of chopped glass fiber is employed. These chopped glass fibers are typically of staple length and are well known articles of commerce. Also, the carbon fibers employed generally will have lengths of 1 to 3 inches long.

Both the glass and carbon fibers are commercially available materials. However, mention should be made that a particularly suitable carbon fiber, for economic reasons, is pitch-based fiber sold under the tradename "Thornel" by Union Carbide Corp., New York, N.Y.

As will be readily appreciated, the carbon fibers will increase the electrical conductivity of the article formed from the compositions containing the carbon fibers. Thus, a greater amount of carbon fiber can be employed than glass fiber. Nonetheless, from about 1 to about 5 parts of glass fiber per hundred parts of copolymer may be employed, and preferably 5 parts of glass fiber and 5 parts of carbon fiber are used.

To obtain the desired degree of flex strength and ease of extrudability, the polyolefin composition should contain between 0.25 pph to 1.0 pph of a fumed silicon dioxide. Apparently the presence of the fumed silicon dioxide also decreases the permeability of thin sheets of such composition to liquids such as bromine.

Generally, the fumed silicon dioxide should have a surface area greater than about 350 $m^2/g$. Such material is commercially available, for example, under the tradename "Cabosil" sold by Cabot Corporation, Boston, Mass.

In addition to the foregoing materials, the compositions of the present invention optionally include 5 pph to about 10 pph of a polypropylene-ethylenically unsaturated carboxylic acid copolymer. The unsaturated acid is present in from about 2% to 10%. Preferably, the acid is acrylic acid. It has been found that the acrylic acid-polypropylene copolymer improves the mixing properties of the composition as well as its weldability. Moreover, such compositions including the acrylic acid modified polypropylene have improved adhesion to metals, which property can be most important if bonding to metal is required. Suitable acrylic acid modified polypropylene materials are available under the tradename "Dexon" from Exxon Company, U.S.A., New York, N.Y. B.

The Mixing Step

In accordance with this invention, the electrically conductive nonporous polyolefin composition is prepared by mixing components under conditions of high shear, for example, in a Banbury mixer at temperatures of at least 125° C. Essentially, Banbury type mixers have two interdigitating screw-like vanes contained in a close-fitting housing which also mounts a ram used to exert pressure on the mixer during mixing if so desired. Heat transfer fluid can be circulated through the passages in the vanes to provide heating or cooling as desired during the mixing operation. During mixing, the charge will, of course, be increasingly heated by the energy expended in the shearing action. Typically, the amount of charge required to fill the mixer to capacity is added portion-wise, generally with heating of the charge and over a period of time ranging from about 3 to 10 minutes. In a preferred embodiment of the present invention, the mixer which has been preheated to a temperature above about 125° C. and preferably above about 135° C. and desirably up to 150° C. is charged with the components in the requisite proportions. Typically, the temperature of the composition after it has been fluxed, i.e. after it is at its final density in its fused state, will be of the order of about 200° C.

C. Extrusion or Shaping Step

It is found that the copolymer blends prepared according to the present invention have suffered very little degradation and are readily formed into thin sheets of foil-like structures which are nonporous to liquids and also have very low resistivity, of a few ohms-cm at most, and which may range from 0.5 to 10 ohms-cm according to circumstances and the amount of carbon black incorporated. More significantly, the copolymer blends prepared in accordance with the present invention can be extruded into thin nonporous sheets at relatively low pressures. Moreover, these thin sheets will have substantially uniform volume resistivities at any point across the face of the sheet below about 10 ohms-cm. Indeed, elements with average volume resistivities below about 2 ohms-cm can be prepared. Additionally, the sheet-like elements prepared in accordance with the present invention have excellent flexural strength. As a ready guide to the quality of the flexural strength of the elements prepared from compositions of this invention, these elements can be repeatedly bent at an angle of greater than 90° without any cracking or tearing of such element. Importantly, such elements also have displayed very little shrinkage and other desirable mechanical properties.

The thin nonporous sheets can be formed, for example, by calendaring or extrusion into thin nonporous foils or sheets having a thickness of between about 150 microns to about 500 microns and preferably from about 250 microns and having a substantially uniform resistivity through the volume of the sheet material at any point over the surface of below about 10 ohms-cm and preferably with average resistivities of below about 2 ohms-cm as measured by ASTM Test Method D-257-61. Indeed, it is preferred to form the thin nonporous sheets by extrustion through a die having the requisite dimensions.

The foils or sheets can be corrugated or given a similar profile by appropriate molding techniques. For use as a bipolar plate in electrochemical cells, it is preferable to mount the sheet in an insulating plastic frame in a manner such as that disclosed in U.S. Pat. No. 3,530,003, for example, which patent is incorporated herein by reference.

As a matter of convenience, after the composition is compounded in a Banbury mixer, it is sent to a dice mill and thereafter fed to a suitable extruder preferably having a "coat hanger" die. The extrusion typically is conducted at temperatures in the range of about 210° C. to 235° C. at rotor speeds of about 100 rpm and an extrusion screw torque of about 3000 meter-grams.

EXAMPLES

The comparative data set forth in the following examples will illustrate the unexpected benefits of the present invention.

EXAMPLES 1 to 8

A series of blends was made using the ingredients set forth in Table I in the proportions recited therein. Each blend was mixed in a Banbury mixer of 1 kg capacity which was preheated for ¼ to ½ hour to a temperature of about 135° C. All the ingredients were simultaneously charged to the mixer in the proportions indicated in the table and at a total amount per charge of about ½ kg. The rotor speed was generally of the order of about 90 rpm. Mixing times were from above 4 minutes to about 6 minutes.

The blend when it was taken out of the mixer was at a temperature of about 235° C. The blend then was fed into a dice mill with a preheated roll temperature of about 185° C. and then chopped into pellets in a dicer. The pellets were then extruded from an extruder screw feed through a flat "coat hanger" die which was heated to about 235° C. to form a sheet 17 centimeters wide and 250 microns thick. Thereafter the resistivities of the resultant blends were determined by the method of ASTM Method D-257-61. Additionally, the materials were bent repeatedly at an angle of between 90° and 180° to test the flex strength. Adhesion to metal was evaluated by determining the ease with which the sheet could be peeled away from a metal sheet with which it had been laminated.

TABLE I

| Example No. | Copolymer parts by wt. | Carbon parts by wt. | Pitch fiber parts by wt. | Glass Fiber parts by wt. | Fumed Silica parts by wt. | Acrylic Acid Polypropylene parts by wt. | Volumes Resistivity ohm-cm | Remarks |
|---|---|---|---|---|---|---|---|---|
| 1 | 100 | 80 | 0 | 0 | 0 | 0 | 0.2 | Very brittle; difficult to extrude |
| 2 | 100 | 20 | 0 | 0 | .5 | 0 | 5 | Not as brittle as Ex. 1; but breaks on bending. |
| 3 | 100 | 15 | 5 | 0 | 1 | 0 | 20 | Resistivity too high; breaks on bending. |
| 4 | 100 | 25 | 5 | 0 | .75 | 0 | 1.0 | Not enough strength, i.e., breaks on bending. |
| 5 | 100 | 25 | 5 | 0 | 1 | 0 | 1.0 | Breaks on bending. |
| 6 | 100 | 25 | 5 | 5 | 1 | 0 | 1.0 | Excellent strength, good extrudability, excellent resistivity, good impermeability |
| 7 | 100 | 35 | 5 | 5 | .75 | 15 | 0.3 | Brittle but good adhesion to metal and low shrinkage. |
| 8 | 100 | 35 | 5 | 10 | .75 | 15 | 0.35 | Brittle but good adhesion |

TABLE I-continued

| Example No. | Copolymer parts by wt. | Carbon parts by wt. | Pitch fiber parts by wt. | Glass Fiber parts by wt. | Fumed Silica parts by wt. | Acrylic Acid Polypropylene parts by wt. | Volumes Resistivity ohm-cm | Remarks |
|---|---|---|---|---|---|---|---|---|
| | | | | | | | | to metal. |

EXAMPLES 9 and 10

In order to test the permeability of the above sheet materials to bromine, samples of the above material were placed as a diaphragm between two solutions, one of which was a 3 molar zinc bromide solution and the other of which was a liquid polybromide complex formed by reacting molecular bromine with an N-methyl, N-ethyl morpholinium bromide. Thereafter the color change of the zinc bromide solution was measured periodically in a colorimeter and compared against standard solutions of bromine in zinc bromide. The relative permeability value of two samples versus a standard bromine solution in zinc bromide is given hereinafter in Table II below. In Example No. 9, the sheet material used had the same composition as that of the Example No. 1 material of Table I, and in Example 10, the sheet material had the same composition as that of the Example No. 6 material of Table I.

TABLE II

| Example No. | Permeability Value (relative) |
|---|---|
| 9 | 100 |
| 10 | 46 |

As can be seen from the foregoing table, a sheet element prepared from a composition of this invention is less than half as permeable as an element prepared from just the copolymer and carbon black.

EXAMPLE 11

A very simple comparison was made between the shrinkage properties of the composition used in Example No. 1 of Table I and the composition of Example No. 6 of Table I by molding those compositions in a 1-inch diameter disc and after cooling to ambient temperature measuring the diameter of the plastic article so molded. It was found that the composition of Example No. 6 shrunk about 3 times less than the composition of Example No. 1.

Other variations were made in composition and treatment conditions than those recited hereinabove, but the desired combinations of peel strength, flex strength, thermal cycle resistance, permeability to liquid bromine resistivity and weldability to other plastics and adhesion to metal and other characteristics were not obtained.

What is claimed is:

1. An electrically conductive polyolefin composition comprising a homogeneous blend of 100 parts by weight of a crystalline polypropylene-ethylene copolymer containing from 20 mole % to about 35 mole % ethylene; from 15 to 30 parts by weight of carbon black; from 0.25 to 1.0 parts by weight of silica; and from 1 to 10 parts by weight of a fiber-reinforcing agent selected from carbon fibers and mixtures of carbon and glass fibers, and when said fiber agent is a mixture of carbon and glass fibers, then said composition shall contain from 1 to 5 parts of glass fibers and from 1 to 5 parts of carbon fibers.

2. The composition of claim 1 wherein said carbon black has a surface area greater than about 500 $m^2/g$.

3. The composition of claim 2 wherein said carbon black has a surface area of about 1000 $m^2/g$.

4. The composition of claim 3 wherein said fiber-reinforcing agent is a mixture of glass and carbon fibers.

5. The composition of claim 4 wherein the silica is a fumed silicon dioxide having a surface area greater than about 350 $m^2/g$.

6. The composition of claim 5 including from about 5 parts to about 10 parts by weight of a polypropylene-ethylenically unsaturated carboxylic acid copolymer wherein said unsaturated acid is present in from about 2% to about 10% by weight.

7. The composition of claim 6 wherein the ethylenically unsaturated carboxylic acid is acrylic acid.

8. A polyolefin composition capable of being extruded into thin sheets having an electric resistivity below about 10 ohm-cm as determined by ASTM Test Method D-257-61 comprising: a homogeneous mixture of 100 parts by weight of a crystalline polypropylene-ethylene copolymer containing from 20 mole % to 35 mole % ethylene; 15 to 30 parts of carbon black; 0.25 to 1.0 part of fumed silicon dioxide; and 1 to 10 parts of a fiber-reinforcing agent selected from carbon fibers and a mixture of carbon and glass fibers containing not more than 5 parts of glass fibers.

9. The composition of claim 8 including from about 5 parts to about 10 parts by weight of a polypropylene-ethylenically unsaturated carboxylic acid copolymer wherein said unsaturated acid is present in from about 2% to about 10% by weight.

10. The composition of claim 9 wherein the ethylenically unsaturated carboxylic acid is acrylic acid.

11. An electrically conductive nonporous polyolefin element comprising a homogeneous mixture of crystalline polypropylene-ethylene copolymer containing from 20 mole % to 35 mole % ethylene and the following constituents in parts by weight per hundred parts by weight of said copolymer:
   (a) 15 to 30 parts of carbon black;
   (b) 1 to 10 parts of a fiber-reinforcing agent selected from carbon fibers and mixtures of carbon and glass fibers containing not more than 5 parts of glass fibers, and
   (c) 0.25 to 1.0 parts of fumed silicon dioxide, said sheet being in the form of a thin sheet having a thickness of from about 150 microns to about 500 microns, and said element having an electric resistivity below about 10 ohm-cm as determined by ASTM Test Method D-257-61.

12. The electrically conductive nonporous element of claim 11 wherein said carbon black has a surface area greater than about 500 $m^2/g$ and wherein said silica has a surface area greater than about 350 $m^2/g$.

13. The nonporous element of claim 12 wherein said fiber-reinforcing agent is selected from a mixture of carbon and glass fibers and wherein 5 parts of glass fibers and 5 parts of carbon fibers are present.

* * * * *